(12) United States Patent
King et al.

(10) Patent No.: US 6,819,878 B1
(45) Date of Patent: Nov. 16, 2004

(54) PACKET-BASED OPTICAL COMMUNICATIONS NETWORKS

(75) Inventors: Jonathan King, Norfolk (GB); Martyn Fice, Herts (GB)

(73) Assignee: Nortel Networks Limited, St. Laurent (CA)

( * ) Notice: Subject to any disclaimer, the term of this patent is extended or adjusted under 35 U.S.C. 154(b) by 611 days.

(21) Appl. No.: 09/708,381

(22) Filed: Nov. 8, 2000

(51) Int. Cl.[7] .............................................. H04J 14/08
(52) U.S. Cl. ...................... 398/189; 398/182; 398/183
(58) Field of Search ..................... 398/54, 51, 154, 398/155, 166; 370/389, 545, 276, 280, 294, 400, 471, 465; 375/354, 355

(56) References Cited

U.S. PATENT DOCUMENTS

| | | | | |
|---|---|---|---|---|
| 4,641,303 A | * | 2/1987 | Vogl ............................ 370/545 |
| 5,278,689 A | * | 1/1994 | Gitlin et al. .................. 398/54 |
| 5,513,030 A | * | 4/1996 | Epworth ...................... 398/198 |
| 6,222,841 B1 | * | 4/2001 | Taniguchi .................... 370/389 |
| 6,549,571 B1 | * | 4/2003 | Baba ........................... 375/224 |
| 6,694,098 B1 | * | 2/2004 | Warbrick et al. ............. 398/54 |

* cited by examiner

Primary Examiner—M. R. Sedighian
Assistant Examiner—David Payne
(74) Attorney, Agent, or Firm—Barnes & Thornburg LLP

(57) ABSTRACT

A structure for an optical packet has a packet header (30) and a digitally encoded packet payload (32). Information is encoded in the header by modulation of a signal comprising a plurality of pulses aligned with regularly occurring timing instants, the payload digits also being aligned with the regularly occurring timing instants. The header information is encoded at a rate lower than the frequency of the timing instants. This structure enables simplified opto-electric circuitry to be used to read the packet header, and also enables the packet header to be used to derive the clock information required to read the high data rate information from the packet payload. This avoids the need for the initial bits of the packet payload to be used to synchronize the clock. The structure is used in an optical communications network.

12 Claims, 2 Drawing Sheets

PACKET-BASED OPTICAL COMMUNICATIONS NETWORKS

FIELD OF THE INVENTION

This invention relates to the field of optical communication networks, and in particular to the processing of packet-based optical signals and to the information stored in the packet headers of such signals.

BACKGROUND OF THE INVENTION

The advantages of packet-based networks are well known. Such systems allow more flexible and efficient use of bandwidth than circuit switched systems.

The recent rapid increase in transmission capacity achieved by optical transmission systems far exceeds the improvements in electronic processing speeds. The conversion of high data rate optical signals into the electrical domain and the processing of such signals provides difficulties and may limit the data handling rates within optical networks. However, this conversion and processing can be required for performing switching and routing functions, and is recognised as causing a restriction.

There have been proposals which provide all-optical networks in which switching and routing take place in the optical domain, thereby avoiding the electrical conversion and processing stages. One proposal involves the use of time-shift keying, but the fine tolerances in timing and delay compensation present serious difficulties.

An alternative proposal is to provide a packet header with information optically encoded at a lower data rate than the data rate of the packet payload. This enables opto-electric conversion circuitry to be employed which has a lower detection bandwidth that that which would be required to carry out opto-electric conversion of the packet payload. Thus, low cost electronics can be used to enable the header to be read for routing purposes, and high speed conversion is required only when the payload data is to be read, at the destination node for the particular signal. The invention is concerned specifically with optical data packets of this type.

One particular problem which arises in asynchronous transmission, such as packet-based transmission, is deriving a clock signal to enable decoding of the packet data. This may be achieved using burst mode receivers or over-sampling receivers, but these are complex and expensive to implement.

SUMMARY OF THE INVENTION

According to a first aspect of the present invention, there is provided a structure for an optical packet for transmission over an optical network, comprising a packet header and a digitally encoded packet payload, wherein information is encoded in the header by modulation of a signal comprising a plurality of pulses aligned with regularly occurring timing instants, the payload digits also being aligned with the regularly occurring timing instants, the header information being encoded at a rate lower than the frequency of the timing instants.

This structure enables simplified opto-electric circuitry to be used to read the packet header, and also enables the packet header to be used to derive the clock information required to read the high data rate information from the packet payload. This avoids the need for the initial bits of the packet payload to be used to synchronise the clock. The packet payload may comprise, for example, a 40 Gb/s data sequence, whereas the packet header may comprise a 2.5 Gb/s data sequence.

The packet header may be binary digitally encoded with the bits representing one logical level comprising a plurality of pulses of equal magnitude and the bits representing the other logical value comprising periods of no signal. Preferably, the header is then constrained to include a minimum number of bits comprising pulses of non-zero magnitude. For example, the packet header may comprise an equal number of bits representing the two logical levels.

Alternatively, data bits in the packet header representing one of the two logical levels may comprise a plurality of pulses of equal fist magnitude and the data bits in the packet header representing the other logical level comprise a plurality of pulses of equal second magnitude. This ensures that there is a continuous stream of high data rate pulses in the header for the clock recovery circuit.

The header may be derived from return to zero pulses aligned with the regularly occurring timing instants. Alternatively, the header may be derived from pulses defining a sequence which alternates between digital high and digital low at successive timing instants. This enables non-return to zero encoding to be used. Pulses in the packet header are then spaced at twice the interval of the timing instants (i.e. the digits in the packet payload). This is appropriate if NRZ pulses are used, and the header then comprises a sequence " . . . 101010 . . . " (at the payload data rate) in order to provide the equally spaced pulses, but each "1" pulse occurs only every second clock cycle at the payload data rate.

According to a second aspect of the present invention, there is provided a method of reading data from an optical packet transmitted over an optical network, the packet comprising a packet header and a digitally encoded packet payload, wherein information is encoded in the header by modulation of a signal comprising a plurality of pulses aligned with regularly occurring timing instants, the payload digits also being aligned with the regularly occurring timing instants, the header information being encoded at a rate lower than the frequency of the timing instants, the method comprising:

using the data in the packet header to activate a clock recovery circuit at the data rate of the data in the packet payload; and processing the data in the packet payload using the recovered clock signal.

The mean pulse power in the header may be measured, and a decision threshold used in the processing of the data in the packet payload selected as a function of the mean pulse power. This simplifies the determination of the decision threshold. This decision threshold will vary as a function of the intensity of the signal, and this is effectively obtained from the header.

According to a third aspect of the present invention, there is provided an apparatus for reading data form a packet payload of an optical packet transmitted over an optical network, the optical packet comprising a packet header and a digitally encoded packet payload, wherein information is encoded in the header by modulation of a signal comprising a plurality of pulses aligned with regularly occurring timing instants, the payload digits also being aligned with the regularly occurring timing instants, the header information being encoded at a rate lower than the frequency of the timing instants, the apparatus comprising:

an opto-electric conversion circuit; and a clock recovery circuit, activated by the data of the packet header to derive a clock signal at the data rate of the packet payload, and a decision circuit which determines whether the payload data signal is above or below a threshold level at instants determined by the clock signal from the clock recovery circuit.

The apparatus may further comprise a circuit for measuring the mean pulse power in the header, and wherein the threshold in the decision circuit is selected as a function of the measured mean pulse power.

The invention also provides for an optical communications network comprising a plural of nodes, wherein data to be transmitted between nodes is encoded in accordance with the invention.

BRIEF DESCRIPTION OF THE DRAWINGS

Examples of the present invention will now be described in detail with reference to the accompanying drawings in which.

DETAILED DESCRIPTION

This invention relates to the encoding of data to form an optical packet, and to apparatus for reading the header (or label) of the packet and for reading the payload of the packet. The invention therefore relates to the physical layer of an optical packet network. This physical layer may be used to implement any desired packet switching mechanism and furthermore, as will be apparent from the following, it does not provide any constraints on the nature or encoding of the payload data within the optical packets. The packet reading and writing system may therefore be used to implement an optical packet based switching network, for example a label based switched network.

Figure 1:
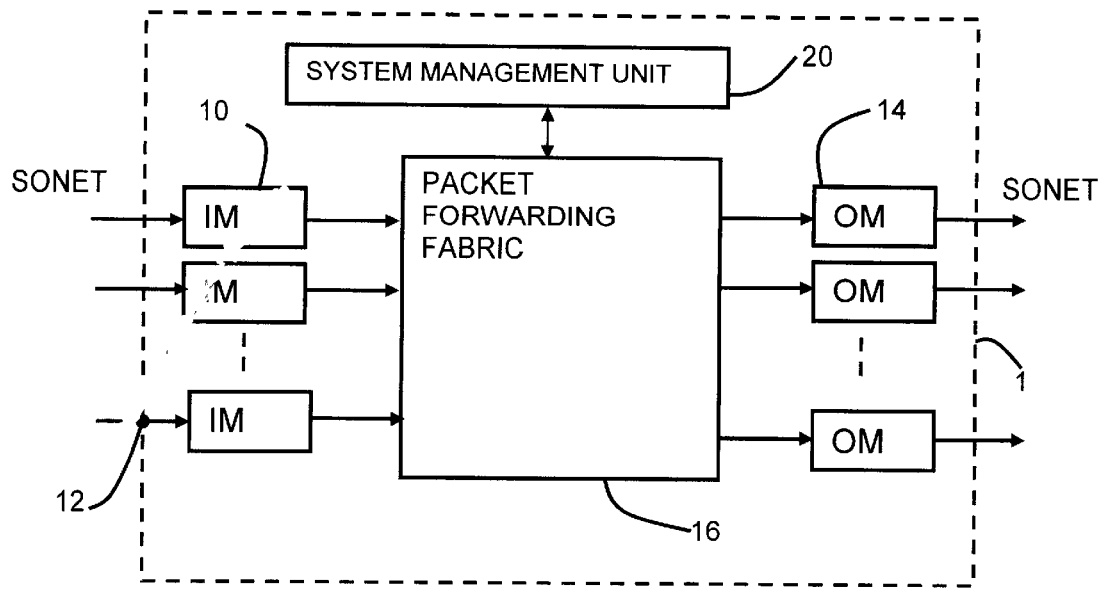
FIG. 1 shows schematically the basic operation of a packet label switch.

For the purposes of explanation, the operation of a conventional label switch operating in an optical network will be explained with reference to FIG. 1.

The fundamental operation of the switching system is to route packets according to information in the label of the packet. As will be known by those skilled in the art, the label contains all the information necessary to assign an output port for the packet. The information within the packet payloads is carried transparently by the label switched network, and the label switch processes only the labels. At the output ports of the switching system, the packets are prepared for the selected physical layer.

Packets are first received by input modules 10 at the input ports 12 of the switch 1. As one example, the physical layer may be the SONET standardised format, as shown in FIG. 1. The function of the input modules 10 is to convert the optical signals at the inputs 12 into electrical signals and to extract the packet header information from that electrical signal, i.e. from the SONET frames.

Output modules 14 perform the reverse functions of the input modules 10, and their main responsibility is to prepare packets for physical transmission over the particular physical layer system used within the network, for example SONET. Changes may also be implemented to the label information, for example to indicate that a particular optical packet has passed through a specific node. For example, the time to line (TTL) counter will be decremented in the label.

The packet forwarding fabric 16 is responsible for transferring packets between the input and output modules. There are numerous additional functions of the packet forwarding fabric, as will be apparent to those skilled in the art, but the primary function is for the switching of packets between the input and output modules. Further functions of the packet switch will not be described in detail, although a system management unit 20 is shown schematically in FIG. 1.

Figure 2:
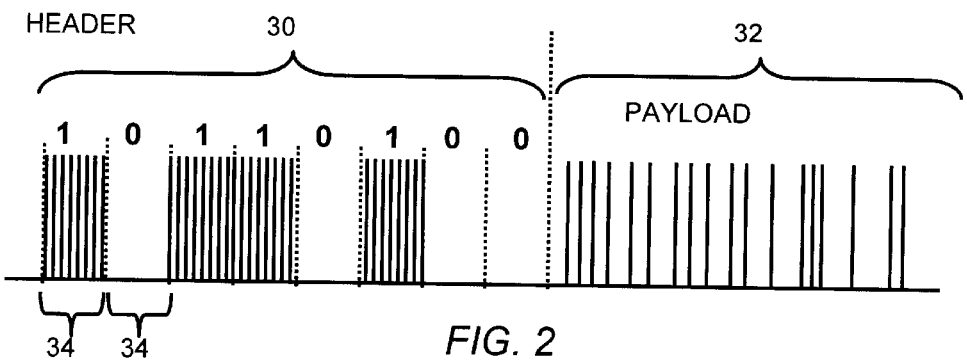
FIG. 2 shows a first packet format in accordance with the invention.

FIG. 2 illustrates a packet structure for use over the physical layer in accordance with the invention. This packet structure may be used to implement a packet switched network, although it may also implement any other switching configuration.

The packet includes a label or header 30 and a packet payload 32. Data is contained in the packet payload 32 at a higher rate than in the packet header 30. The header and payload contain optical return-to-zero (RZ) pulses in the example shown in FIG. 2, and the payload data rate may be 40 Gb/s whereas the header may contain data at 2.5 Gb/s. The data rate within the payload 32 will, however, depend upon the services being provided by the optical network. It is envisaged that the data rate within the payload 32 is significantly greater than in the header 30. In particular, the data rate within the header is intended to be sufficiently low that after opto-electronic conversion the header information can be read by readily available electronic circuitry. It is also preferred that the payload 32 and header 30 are encoded by suitable modulation of a single optical carrier signal. This minimises dispersion effects during transmission of the optical packet.

Each data bit 34 in the packet header represents a "1" or a "0". In the example of FIG. 2, data bits representing a "1" comprise a plurality of pulses of equal magnitude, the pulse rate corresponding to the data rate of the packet payload. Thus, each "1" of the header has a "111111 . . . " sequence at the payload rate, so that the header provides a strong spectral content at the payload clock frequency.

The header is constrained to contain a minimum number of 1's to provide strong spectral content at the payload clock frequency, enabling clock recovery. For example, the packet header may comprise an equal number of 1's and 0's, which also enables a simple error detection scheme to be implemented.

In order to read the packet header, a beam divider or beam splitter provides one path for conversion of the header into the electrical domain. The other path remains in the optical domain, so that the packet payload is passed transparently. The frequency response of the opto-electric converter may be such that detection of the payload 32 is not possible, and only the lower bit rate header 30 may be converted. The electrical header data is then read by header reading circuitry. The header reading circuitry essentially performs the functions of the input module 10 shown in FIG. 1, and accordingly may derive the ATM switching information from the header if the invention is being used in an ATM switching network. Irrespective of the particular switching characteristics of the network, the header reading unit will derive information from the header enabling control of switching units to provide the desired routing of the optical packets.

Figure 3:
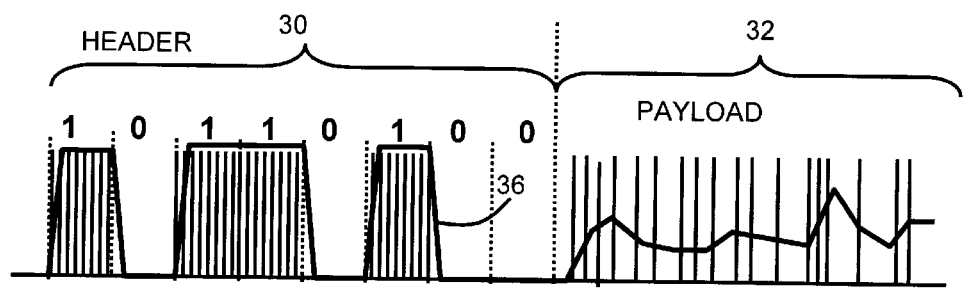
FIG. 3 shows how the header information can be read from the packet of FIG. 2.

FIG. 3 shows how low pass filtering can be used to recover the header information from the sequence of high data rate pulses in the header. As shown, the output 36 of a low pass filter reconstructs the signal at the header bit rate.

As described above, it may be desirable to update the header to indicate that the packet has passed through a particular switching unit. For this purpose, header updating circuitry is provided which generates modified data for the header which is then translated back into the optical domain. The large difference between the header and payload data rates means that the header does not need to be phase locked to the payload when being written, because the low pass filtering shown above removes the payload clock content when reading the header.

Figure 4:
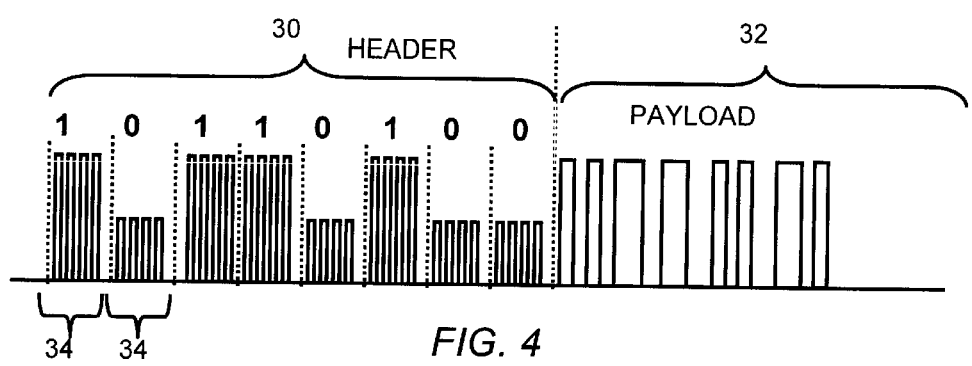
FIG. 4 shows a second packet format in accordance with the invention.

FIG. 4 shows an alternative packet format, in which the 1's and 0's of the packet header are both encoded as a series of pulses, but with two different, non-zero amplitudes being used to distinguish between the two values. This ensures that there is a continuous stream of high data rate pulses in the header for the clock recovery circuit, FIG. 4 also shows that the invention may be applied to systems using non-return-to-zero (NRZ) data, by encoding the header bits as " . . . 101010 . . . " sequences at the payload data rate. Such sequences have strong spectral content at half the payload clock frequency, which can be used to derive the payload clock signal.

In FIG. 4, an amplitude modulation depth of 50% is shown. As a ether alternative, low modulation depth amplitude modulation can be used in the header or label 30. In other words, the header signals have either a first maximum amplitude representing a first value or else a second amplitude representing a second value, the second value only slightly lower than the maximum. For example, the encoding of ones and zeros in the header 30 may result in signals of either maximum amplitude or of 90% amplitude. This low modulation depth amplitude modulation enables the header to be updated in a simpler manner, for example using optical attenuation only. For example, a header may be erased by constraining the pulses to have equal amplitude (i.e. the 90% level) and then modulated again at the low modulation depth.

The manner in which the payload data 32 is encoded is of no consequence, and accordingly numerous physical layer configurations may benefit from an optical packet header structure of the invention.

The need to read the packet header or label is described above, and the packet payload can pass transparently through the network. Of course, the payload will need to be read at the destination node, and the packet structure of the invention enables a clock signal to be recovered from the header to enable the payload to be read. The strong spectral content at the payload rate in the header may be used to activate a PLL (phase locked loop) circuit. For a 2.5 Gb/s header with 32 bits, this represents 512 bits at 40 Gb/s, which is sufficient to tune the PLL circuit to the clock frequency. This clock signal is then used for processing the data in the packet payload, for instance to define the instants at which a decision circuit is triggered to determine the logical level of each bit in the payload signal. The clock only needs to remain synchronised with the bit stream for the duration of the packet, so that the accuracy of the clock may not need to be extremely high, enabling the clock signal to be recovered from a relatively small number of bits.

Figure 5:
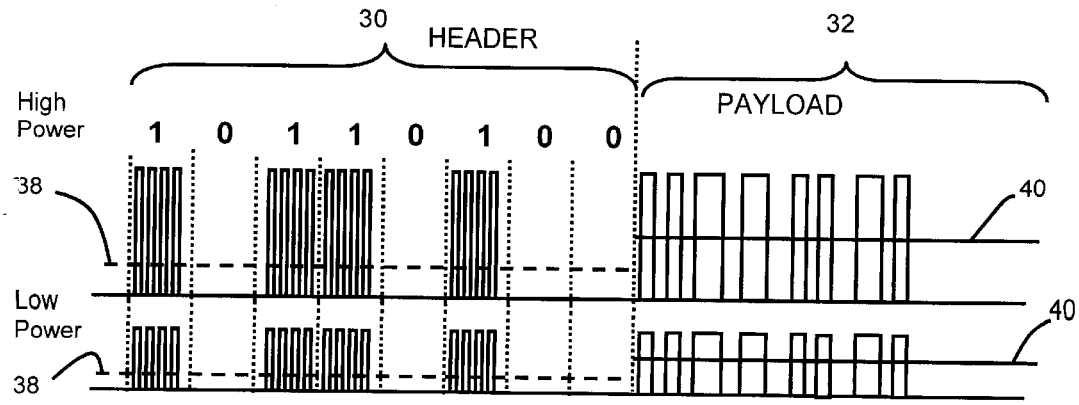
FIG. 5 is used to explain a threshold tuning operation.

FIG. 5 shows how the header in the packet structure of the invention can be used to determine the decision threshold for the processing of the payload. The mean pulse power 38 in the header is measured, and this provides an indication of the intensity of the optical pulses. For example, if the number of 1's and 0's in the header is known (for example if there is the same number of each) then the peak pulse power can be determined from the measured mean. This peak power will vary as a function of the distance travelled across the network, and the performance of the nodes through which the signal has passed.

In the payload processing circuitry, a decision threshold is applied, such that optical signals of higher intensity than the threshold are interpreted as 1's whereas signals of lower intensity are interpreted as 0's. This threshold level 40 is varied as a function of the measured intensity, so that it falls at the optimum level between the high and low expected pulse amplitudes. This avoids the need for more complicated circuitry which determines and sets the decision threshold based on an analysis of the payload data.

Figure 6:
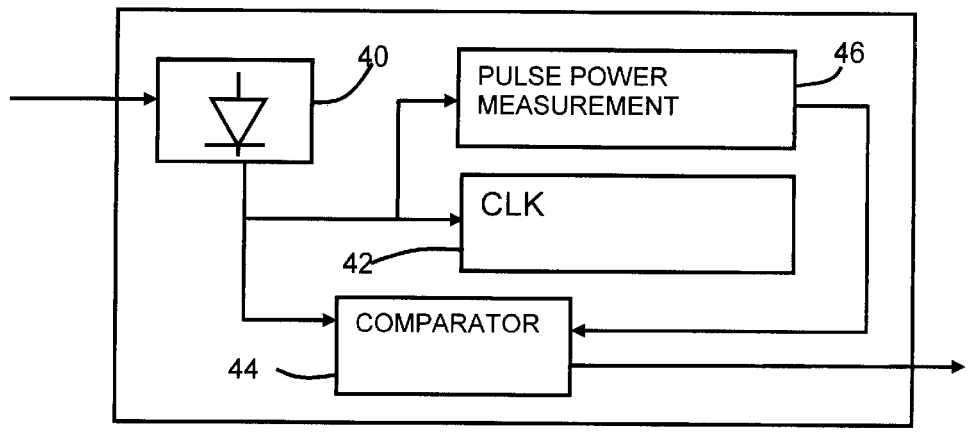
FIG. 6 shows an apparatus for reading the packet payload.

FIG. 6 shows an apparatus for reading data from the packet payload, in which an opto-electric conversion circuit 40 converts the incoming signal into electrical pulses, which are used by a clock recovery circuit to derive a clock signal at the data rate of the packet payload, within the duration of the packet header. The clock signal is then used to determine the timing instants at which the electric signal (which represents the light intensity at the input) is compared to the decision threshold in the comparator circuit 44. A circuit 46 is also provided for measuring the mean pulse power in the header, and the decision threshold of the comparator 44 is selected as a function of the measured mean pulse power.

Figure 7:
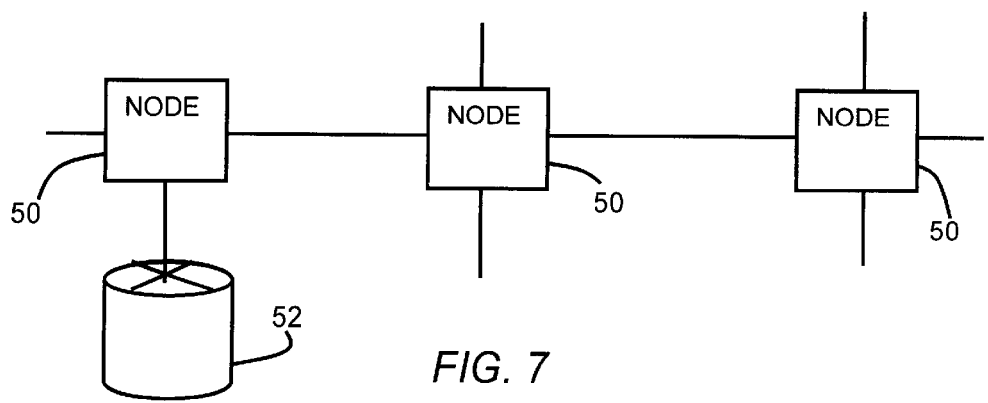
FIG. 7 shows a network in accordance with the invention.

The invention can be used in an optical communications network comprising a plurality of nodes 50, as shown in FIG. 7. Each node comprises opto-electric conversion circuitry for reading the packet header, implemented as the Input Module described with reference to FIG. 1. These input modules have a bandwidth lower than that required to read the packet payload. The apparatus of FIG. 6 for reading the payload data is provided in a receiving unit 52 for receiving data from the network.

What is claimed is:

1. A structure for an optical packet for transmission over an optical network, comprising a packet header and a digitally encoded packet payload, wherein information is encoded in the header by modulation of a signal comprising a plurality of pulses aligned with regularly occurring timing instants, the header thereby enabling extraction of a clock signal corresponding to the regularly occurring timing instants, the payload digits also being aligned with said regularly occurring timing instants, the header information being encoded at a rate lower than the frequency of the timing instants.

2. An optical packet structure as claimed in claim 1, wherein the packet header is binary digitally encoded, data bits representing one logical level comprising a plurality of pulses of equal first magnitude and data bits representing the other logical level comprising a plurality of pulses of equal second magnitude.

3. An optical packet structure as claimed in claim 2, wherein the packet header comprises a defined number of bits of each logic level.

4. An optical packet structure as claimed in claim 1, wherein the packet header is binary digitally encoded, data bits representing one logical level comprising a plurality of pulses of equal magnitude and data bits representing the other logical level comprising periods of no signal.

5. An optical packet structure as claimed in claim 1, wherein the plurality of pulses modulated to encode the header comprise return to zero pulses aligned with the regularly occurring timing instants.

6. An optical packet structure as claimed in claim 1, wherein the plurality of pulses modulated to encode the header comprise a sequence of pulses which alternates between digital high and digital low at successive timing instants.

7. A method of reading data from an optical packet transmitted over an optical network, the packet comprising a packet header and a digitally encoded packet payload, wherein information is encoded in the header by modulation of a signal comprising a plurality of pulses aligned with regularly occurring timing instants, the payload digits also being aligned with the regularly occurring timing instants, the header information being encoded at a rate lower than the frequency of the timing instants, the method comprising:

using the data in the packet header to active a clock recovery circuit at the data rate of the data in the packet payload; and processing the data in the packet payload using the recovered clock signal.

8. A method as claimed in claim 7, wherein the mean pulse power in the header is measured, and wherein a decision threshold used in the processing of the data in the packet payload is selected as a function of the mean pulse power.

9. An apparatus for reading data from a packet payload of an optical packet transmitted over an optical network, the packet comprising a packet header and a digitally encoded packet payload, wherein information is encoded in the header by modulation of a signal comprising a plurality of pulses aligned with regularly occurring timing instants, the payload digits also being aligned with the regularly occurring timing instants, the header information being encoded at a rate lower than the frequency of the timing instants, the apparatus comprising:

an opto-electric conversion circuit; and a clock recovery circuit, activated by the data of the packet header to derive a clock signal at the data rate of the packet payload, and a decision circuit which determines whether the payload data signal is above or below a threshold level at instants determined by the clock signal from the clock recovery circuit.

10. Apparatus according to claim 9, further comprising a circuit for measuring the mean pulse power in the header, and wherein the threshold in the decision circuit is selected as a function of the measured mean pulse power.

11. An optical communications network comprising a plurality of nodes, wherein data to be transmitted between nodes is encoded as packets, each packet comprising a packet header and a digitally encoded packet payload, wherein information is encoded in the header by modulation of a signal comprising a plurality of pulses aligned with regularly occurring timing instants, the header thereby enabling extraction of a clock signal corresponding to the regularly occurring timing instants, the payload digits also being aligned with said regularly occurring timing instants, the header information being encoded at a rate lower than the frequency of the timing instants, and wherein the packet headers include routing information, each node comprising a first opto-electric conversion circuit for reading the packet header, the conversion circuitry having a bandwidth lower than that required to read the packet payload.

12. A network as claimed in claim 11, wherein some or all nodes are associated with receiving units for receiving data from the network, the receiving units comprising a second opto-electric conversion circuit for reading the packet payload and a clock recovery circuit, activated by the data of the packet header to derive a clock signal at the data rate of the packet payload, wherein the clock signal is used for processing the data in the packet payload.

* * * * *